US007502673B2

(12) United States Patent
Robinson et al.

(10) Patent No.: US 7,502,673 B2
(45) Date of Patent: Mar. 10, 2009

(54) METHOD AND APPARATUS FOR REMOTE VEHICLE COMMUNICATION

(75) Inventors: Timothy A. Robinson, Avon, IN (US); James H. Stewart, Gulfport, MS (US); Stephen J. Hussey, Pittsboro, IN (US)

(73) Assignee: General Motors Corporation, Detroit, MI (US)

( * ) Notice: Subject to any disclaimer, the term of this patent is extended or adjusted under 35 U.S.C. 154(b) by 252 days.

(21) Appl. No.: 11/153,173

(22) Filed: Jun. 15, 2005

(65) Prior Publication Data

US 2006/0047385 A1 Mar. 2, 2006

Related U.S. Application Data

(60) Provisional application No. 60/604,764, filed on Aug. 26, 2004, provisional application No. 60/604,773, filed on Aug. 26, 2004, provisional application No. 60/604,591, filed on Aug. 26, 2004.

(51) Int. Cl.
*G06F 11/30* (2006.01)

(52) U.S. Cl. ........................ 701/35; 701/2; 340/870.03; 340/438; 340/455; 348/211.3

(58) Field of Classification Search ................... 701/35, 701/2, 33, 29; 340/572.1, 870.01, 870.03, 340/870.3, 438, 455; 702/60, 181; 700/94; 348/211.3; 709/217
See application file for complete search history.

(56) References Cited

U.S. PATENT DOCUMENTS

| | | | | |
|---|---|---|---|---|
| 5,689,420 | A * | 11/1997 | Brewster | 701/14 |
| 6,067,009 | A * | 5/2000 | Hozuka et al. | 340/459 |
| 6,225,898 | B1 * | 5/2001 | Kamiya et al. | 340/505 |
| 6,438,472 | B1 * | 8/2002 | Tano et al. | 701/35 |
| 6,587,646 | B2 * | 7/2003 | Kikuchi et al. | 399/8 |
| 6,609,051 | B2 * | 8/2003 | Fiechter et al. | 701/33 |
| 6,636,789 | B2 * | 10/2003 | Bird et al. | 701/29 |
| 6,665,606 | B2 * | 12/2003 | Mathew et al. | 701/114 |
| 6,745,151 | B2 * | 6/2004 | Marko et al. | 702/182 |
| 6,745,153 | B2 | 6/2004 | White et al. | 702/184 |
| 6,751,512 | B1 * | 6/2004 | Kumamoto | 700/94 |
| 7,076,532 | B2 * | 7/2006 | Craik | 709/217 |
| 7,099,750 | B2 * | 8/2006 | Miyazawa et al. | 701/1 |
| 7,336,174 | B1 * | 2/2008 | Maloney | 340/572.1 |
| 7,356,393 | B1 * | 4/2008 | Schlatre et al. | 701/33 |
| 2002/0099520 | A1 * | 7/2002 | Falada et al. | 702/182 |
| 2002/0105443 | A1 * | 8/2002 | Flick | 340/988 |
| 2002/0116103 | A1 | 8/2002 | Matsunaga et al. | |
| 2002/0197955 | A1 * | 12/2002 | Witkowski et al. | 455/41 |
| 2002/0198997 | A1 * | 12/2002 | Linthicum et al. | 709/227 |
| 2003/0095038 | A1 * | 5/2003 | Dix | 340/425.5 |
| 2003/0109972 | A1 * | 6/2003 | Tak | 701/29 |

(Continued)

FOREIGN PATENT DOCUMENTS

| | | |
|---|---|---|
| EP | 1245018 | 1/2004 |

(Continued)

*Primary Examiner*—Tuan C To

(57) ABSTRACT

A method for remote vehicle communication is provided. The method monitors, stores and/or transmits data representative of the operation of a component or system, whereby the transmitted data may be analyzed and vehicle performance improved through the analysis thereof. Additionally, the vehicle systems are remotely accessible such that a technician can remotely analyze the vehicle without taking control of the vehicle away from the consumer.

10 Claims, 5 Drawing Sheets

U.S. PATENT DOCUMENTS

2003/0156875 A1* 8/2003 Inoue .......................... 400/74
2004/0093154 A1* 5/2004 Simonds et al. ............. 701/200
2004/0204805 A1* 10/2004 Betters et al. ................. 701/35
2005/0021292 A1* 1/2005 Vock et al. .................. 702/182
2006/0184827 A1* 8/2006 Robinson et al. .............. 714/32
2006/0271254 A1* 11/2006 Shah et al. .................... 701/29

FOREIGN PATENT DOCUMENTS

EP 1403454 3/2004
JP 07190894 A * 7/1995
JP 2003260993 A * 9/2003

* cited by examiner

METHOD AND APPARATUS FOR REMOTE VEHICLE COMMUNICATION

CROSS REFERENCE TO RELATED APPLICATONS

This Application claims the benefit of U.S. Provisional Application 60/604,764, 60/604,773, and 60/604,591, filed Aug. 26, 2004, which are hereby incorporated by reference in their entirety.

BACKGROUND OF THE INVENTION

Onboard vehicle maintenance systems, diagnostic systems, engineering development devices, and testing systems that monitor vehicular components and systems typically rely on manual input from an operator and/or technician and require the physical presence of the vehicle during analysis.

SUMMARY OF THE INVENTION

An automated data collection and transmission system would provide the ability to observe the behavior of vehicular components and systems in the field (i.e. remotely), as the components and systems are being operated, which would provide significant advantages to vehicle manufacturers. A method and apparatus for in-vehicle telematics communication is therefore provided. The apparatus includes a maintenance system for a vehicle having a component or system with a measurable characteristic. The maintenance system includes at least one sensor configured and positioned with respect to the component or system to measure, and thereby obtain a value for, the measurable characteristic.

The sensor transmits a signal indicating the value of the measurable characteristic to a microprocessor. The microprocessor is configured according to the method of the present invention to analyze the value of the measurable characteristic and thereby identify correctable aberrations in the vehicle's operation. The microprocessor is further configured to transmit the value of the measurable characteristic which may be indicative of a potential aberration to a user interface.

Preferably, the maintenance system includes a data recorder module for transmitting values of the measurable characteristic to an offboard network or data collection device, and for receiving instructions therefrom to correct aberrations in the vehicle's operation. The maintenance system is thus able to regularly communicate performance data of the component or system to an offboard network for use by a technician or others.

The ability to transmit data from a vehicle to a remote location is particularly advantageous, for example, when a vehicle is inaccessible. Vehicles are often tested in distant, environmentally extreme locations and the ability to collect vehicle data from vehicles in such locations without physically visiting the vehicles would simplify the process of vehicle testing. Further, a system that allows an engineer to collect data from a vehicle as it is being operated by a consumer would allow the engineer access to vehicle system data without taking control of the vehicle away from the consumer.

An automated or unattended data collection and transmission system is also preferably provided according to a method of the present invention. Such a system removes the obligation of manually controlling data collection while retaining the advantages inherent in manual data collection. Such a system may provide valuable advantages over strictly manual data collection systems. An automated data collection system may eliminate user error, thereby improving the quality of the data. Further, an automated data collection system potentially provides for detection of vehicle malperformance prior to its detection by the operator. Automated vehicle system data collection may also improve vehicle performance in a vast multitude of driving conditions by continuously monitoring the vehicle and adjusting its systems to function at peak performance depending upon the vehicle's physical location and current driving environment.

The apparatus of the present invention is preferably composed of hardware adapted to initialize quickly after power-up, thereby allowing data collection much sooner after vehicle ignition than previously possible. Similarly, the method of the present invention is preferably composed of an algorithm optimized for quick initialization after power-up. Additionally, the apparatus is preferably configured to automatically shut down after the vehicle's ignition is turned off such that the vehicle battery is not drained.

The above features, and advantages, and other features, and advantages, of the present invention are readily apparent from the following detailed description of the best modes for carrying out the invention when taken in connection with the accompanying drawings.

DESCRIPTION OF THE PREFERRED EMBODIMENTS

Figure 1:
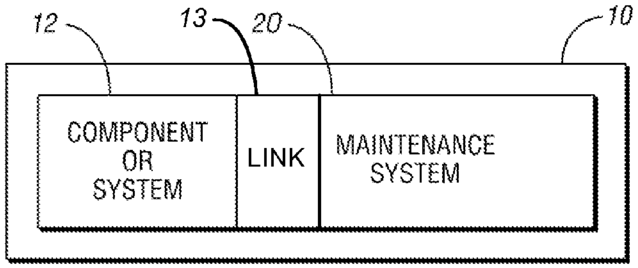
FIG. 1 is a schematic illustration of a maintenance system in accordance with an aspect of the invention.

FIG. 1 is a schematic depiction of a maintenance system or device 20 installed in a vehicle 10. The vehicle 10 includes at least one vehicle communications link 13, a plurality of components and systems, including a steering system; a braking system; a fuel storage system; an engine; a heating, ventilating and air conditioning system; a battery; a transmission; a motor; an alternator; a fuel pump; a water pump; a regulator; etc. One or more of these components or systems being monitored will be identified as component or system 12 (which may include any of the above listed systems, for example).

Figure 2:
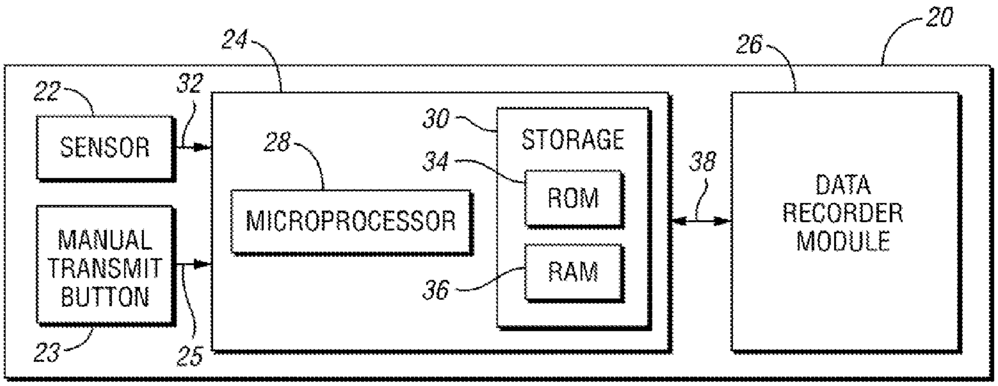
FIG. 2 is a more detailed schematic illustration of the maintenance system of FIG. 1.

Referring to FIG. 2, the maintenance system 20 includes a plurality of sensors 22, one or more electric control unit or ECU 24, and a data recorder module 26. The electronic control unit 24 further includes a microprocessor 28, and a data storage medium 30. According to a preferred embodiment, the maintenance system 20 also includes a manual transmit button 23 that is preferably disposed within the vehicle's passenger compartment and is electronically connected to the ECU 24. The manual transmit button 23 generates a transmit signal 25 telling the ECU 24 to transmit the recorded data, and thereby allows an occupant of the vehicle to manually transmit the data if, for example, the vehicle is operating abnormally. The ECU 24 transmits data to and receives data from the data recorder module 26 in the form of recorder signals 38.

Figure 3:
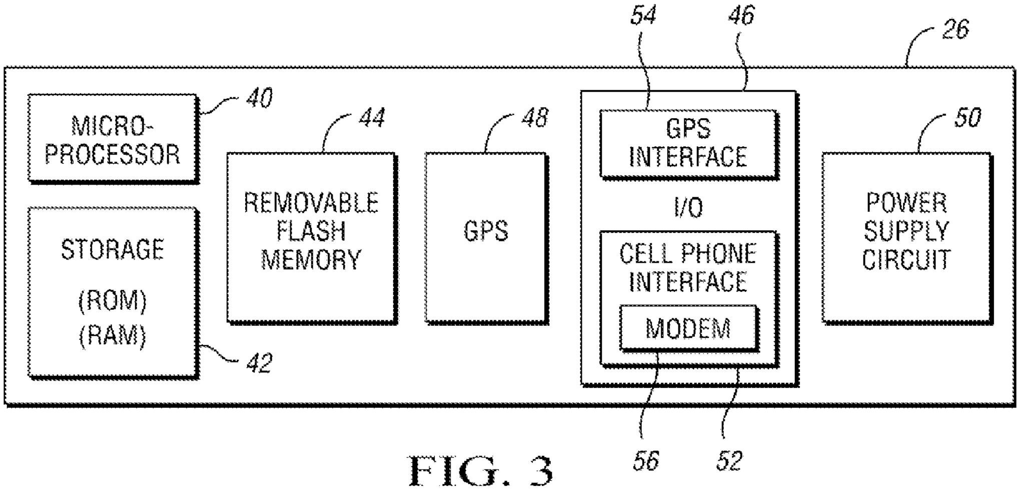
FIG. 3 is a schematic illustration of a data recorder module in accordance with an aspect of the invention.

As shown in FIG. 3, the data recorder module 26 preferably includes a microprocessor 40, a data storage device 42 (preferably including RAM and ROM), removable flash memory 44, an input/output interface 46, a global positioning system or GPS circuit 48, and a power supply circuit 50. The input/output interface 46 is preferably adapted to accommodate a cell phone interface 52 and a GPS interface 54 to connect to PC mapping software. The cell phone interface 52 preferably includes a modem connection 56 and allows an off site technician to prompt the ECU 24 to record and/or transmit data representative of component or system 12 operation.

FIGS. 4-10 depict a method for communicating with a vehicle 10 (shown in FIG. 1) according to the present invention. More precisely, FIGS. 4-10 show a series of block diagrams representing steps performed by the microprocessor 40 (shown in FIG. 3).

Figure 4:
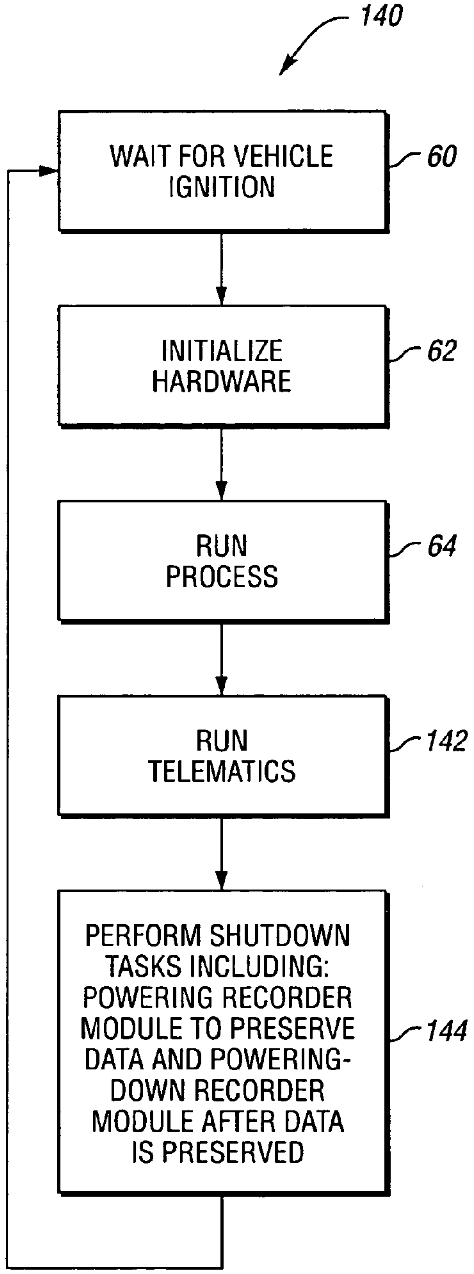
FIG. 4 is a block diagram illustrating a method according to a preferred embodiment of the present invention.

Referring to FIG. 4, the method of remote vehicle communication 140 (also referred to herein as algorithm 140) of the present invention is configured at step 60 to initiate when the vehicle 10 (shown in FIG. 1) is started. At step 62, the data recorder module 26 (shown in FIGS. 2-3) is initialized. At step 64, the algorithm runs the data recorder module process. At step 142, telematics processes are run as will be described in detail hereinafter. At step 144, shutdown tasks are performed. Shutdown tasks are preferably user-defined but may include, for example, saving vehicle setup data and powering down hardware for energy conservation.

The shutdown tasks of step 144 are preferably user-defined but may include, for example, saving vehicle setup data. Also at step 66, when vehicle shutdown is detected the power supply circuit 50 (shown in FIG. 3) may be configured to power the data recorder module 26 (shown in FIGS. 2-3) long enough to allow the microprocessor 40 (shown in FIG. 3) to save any relevant data. After the relevant data has been saved, the data recorder module 26 may be powered-down by the power supply circuit 50. In this manner, the vehicle's battery (not shown) is not unnecessarily drained because the data recorder module 26 is powered by the power supply circuit 50 when the vehicle 10 (shown in FIG. 1) is not running. Additionally, energy is conserved by automatically powering-down the data recorder module 26 after the relevant data has been saved.

Steps 62 and 64 are described in more detail in the incorporated application 60/604,764.

Figure 5:
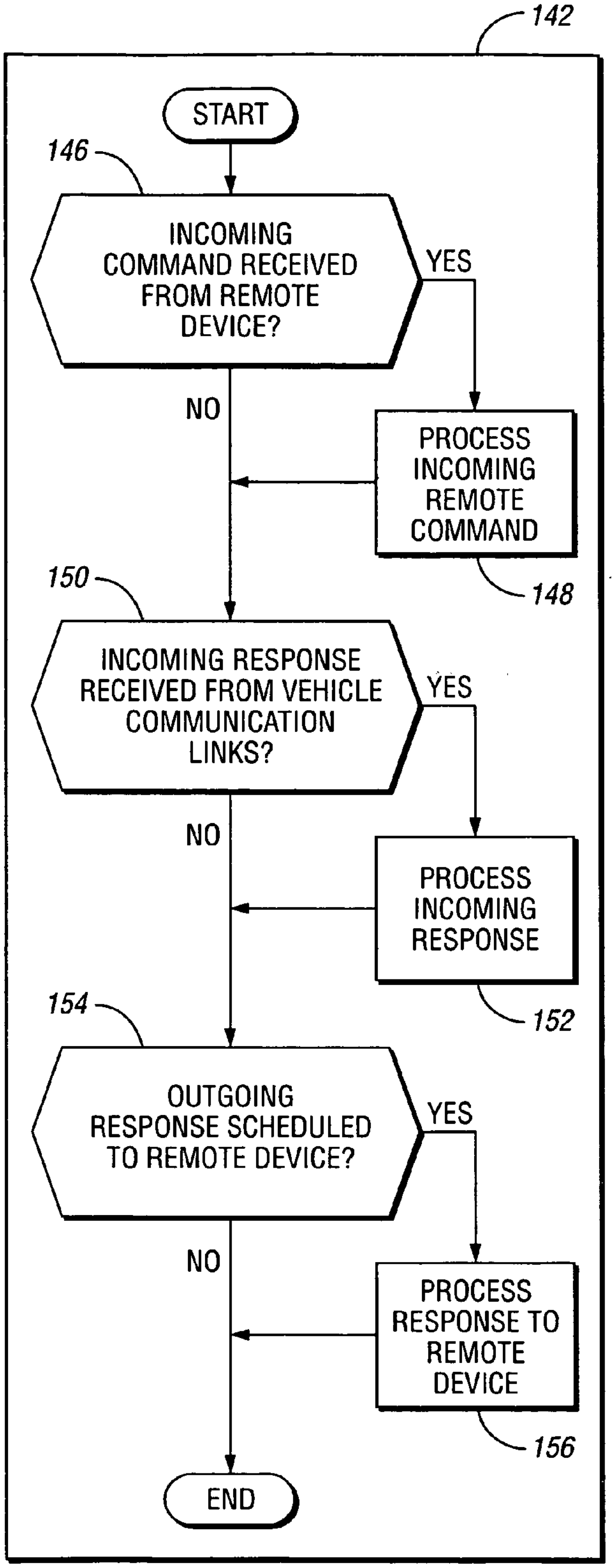
FIG. 5 is a block diagram illustrating a step wherein a telematics process of FIG. 4 is run.

Referring to FIG. 5, step 142, wherein the telematics processes are run, is shown in more detail. At step 146, if an incoming command is received from a remote device the command is processed at step 148 as will be described in detail hereinafter. The remote device may include, for example, a cell phone but may also include any other device adapted to send a signal from a remote location. At step 150, if an incoming response is received from one of the vehicle's communication links, the response is processed at step 152 as will be described in detail hereinafter. A response received from the vehicle's communication links 13 would typically be from one of the vehicle control modules. At step 154, if an outgoing response is scheduled to be sent to a remote device, the response is processed at step 156 as will be described in detail hereinafter.

Figure 6:
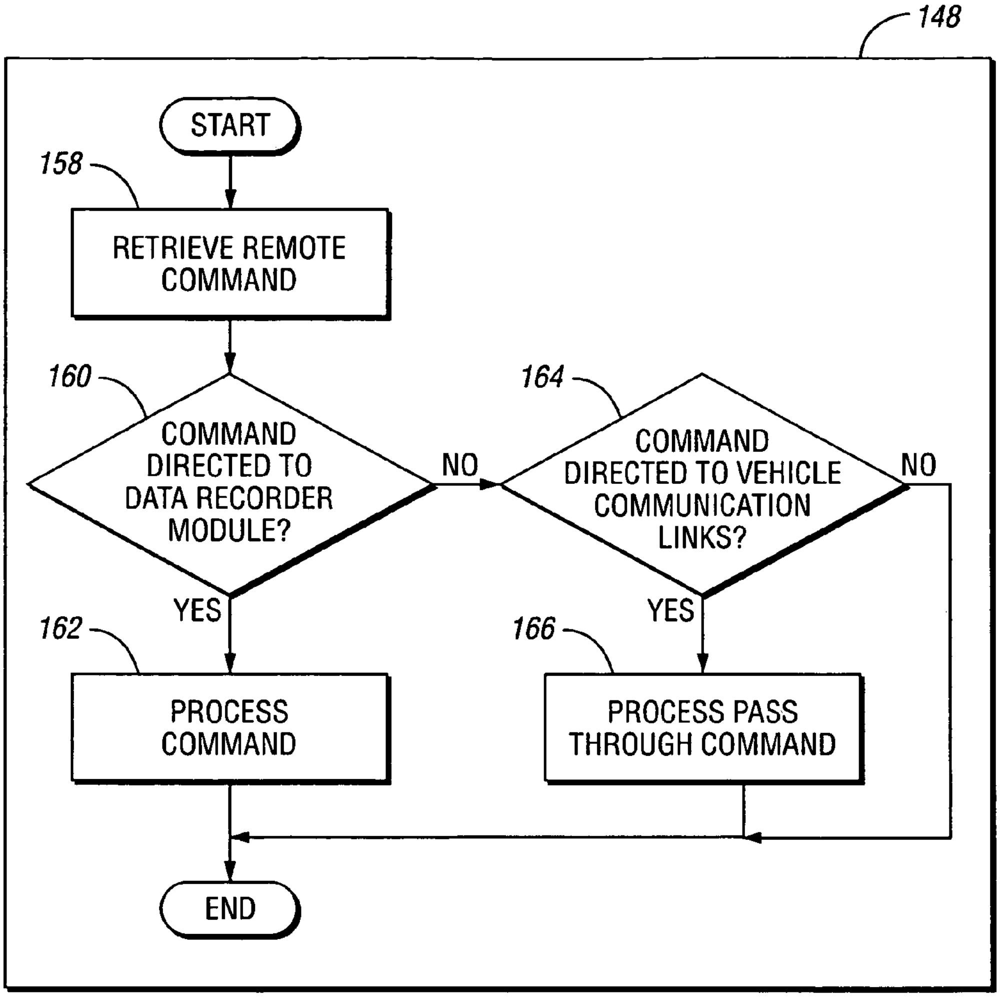
FIG. 6 is a block diagram illustrating a step wherein an incoming remote command of FIG. 5 is processed.

Referring to FIG. 6, step 148, wherein an incoming remote command is processed, is shown in more detail. At step 158 the incoming remote command is retrieved. At step 160, if the incoming remote command is directed to the data recorder module 26 (shown in FIGS. 2-3) the command is processed at step 162 as will be described in detail hereinafter. If the incoming remote command is not directed to the data recorder module at step 160, the algorithm 140 proceeds to step 164. At step 164, if the incoming remote command is directed to a vehicle communication link 13 (i.e. a pass-through command), the pass-through command is processed at step 166 as will be described in detail hereinafter.

Figure 7:
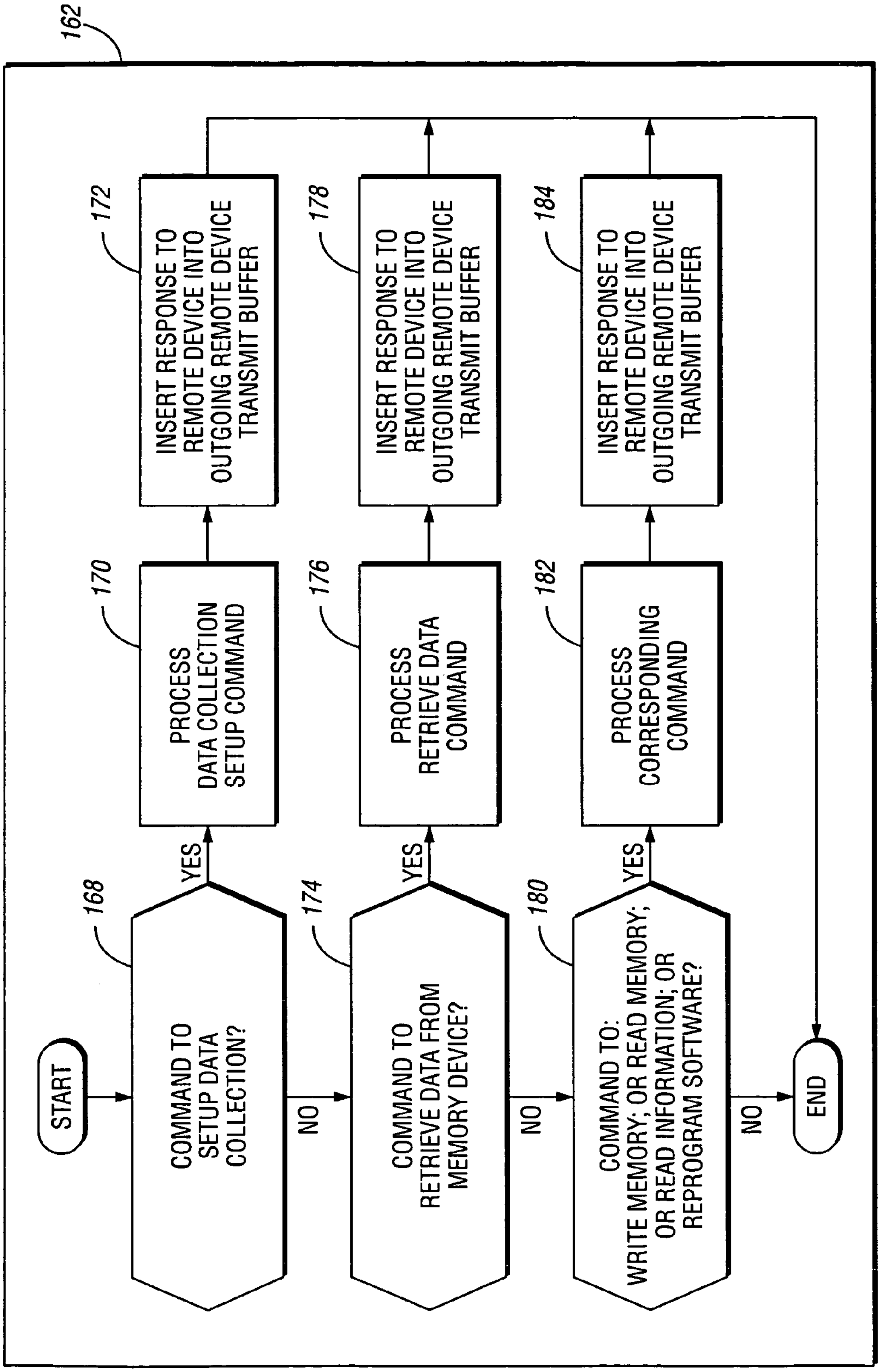
FIG. 7 is a block diagram illustrating a step wherein a command of FIG. 6 is processed.

Referring to FIG. 7, step 162, wherein an incoming remote command directed to the data recorder module is processed, is shown in more detail. At step 168 the algorithm 140 checks for a signal commanding the data recorder module to set up data collection. This set-up command typically tells the data recorder module 26 (shown in FIGS. 2-3) which type of data to collect from the relevant vehicle control modules (not shown). The type of data collected is user defined but may include, for example, data pertaining to engine temperature, engine output, turbine acceleration, shift duration, etc. If there is a signal commanding the data recorder module to set up data collection at step 168, the algorithm 140 proceeds to step 170 wherein the command is processed and thereafter to step 172 at which a response to the command is inserted into an outgoing transmit buffer. The response generated at step 172 includes an acknowledgement that the command was received as well as an indication of the commands success. If there is not a signal commanding the data recorder module to set up data collection at step 168, the algorithm proceeds to step 174.

At step 174, the algorithm 140 checks for a command to retrieve data from the data recorder module 26 (shown in FIGS. 2-3). If there is a command to retrieve data from the data recorder module 26 at step 174, the algorithm proceeds to step 176 wherein the command is processed and thereafter to step 178 at which a response to the command is inserted into an outgoing transmit buffer. If there is not a command to retrieve data from the data recorder module at step 174, the algorithm proceeds to step 180.

At step 180, the algorithm 140 checks for any of the following commands: a command to write data recorder module memory; a command to read data recorder module memory; a command to read data recorder module information; or a command to reprogram data recorder module software. If there is such a command at step 180, the algorithm proceeds to step 182 wherein the command is processed and thereafter to step 184 at which a response to the command is inserted into an outgoing transmit buffer.

Figure 8:
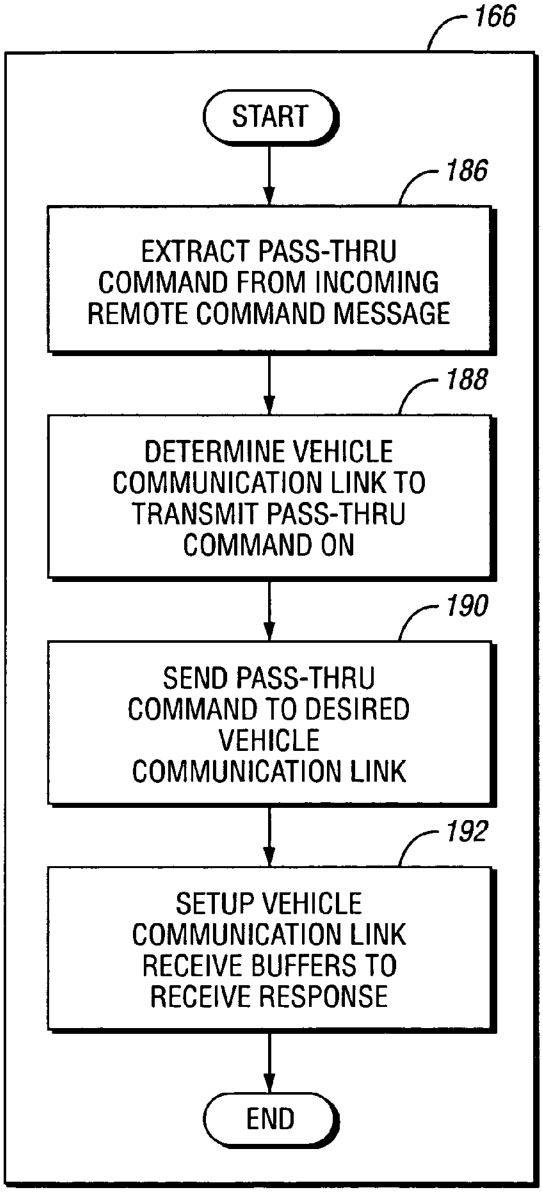
FIG. 8 is a block diagram illustrating a step wherein a pass-through command of FIG. 6 is processed.

Referring to FIG. 8, step 166, wherein a pass-through command is processed, is shown in more detail. The pass-through command is so named because the command is not directed to the data recorder module 26 (shown in FIGS. 2-3) but rather just passes through the data recorder module 26 to a communication link 13 such that the pass-through command is transferable to any vehicle system. As the pass-through commands may originate from a remote location, the present invention allows remote access to any of the vehicle systems. As an example, a technician may remotely access any vehicle system to analyze and/or reprogram the systems control unit to improve vehicle performance. At step 186, the pass-through command is extracted from the incoming remote command message. This step is incorporated to separate the raw data of the command from additional header information included in the remote command message. The header information may include, for example, information indicating the date and time of the message, as well as information telling the data recorder module 26 where to send the pass-through command.

At step 188, the algorithm 140 determines which specific vehicle communication link to transmit the pass-through command on. This determination may be made based on information contained in the header of the incoming remote command message. At step 190, the pass-through command is sent to the vehicle communication link 13 selected at step 188. If the pass-through command prompts a response, the data recorder module sets up a vehicle communication link 13 to receive the response at step 192. In the manner described herein, the method of the present invention may be configured to send any pass-through message on any vehicle communication link. Accordingly, an off-site technician has as much access to the vehicle systems remotely as would be available through a physical connection.

Figure 9:
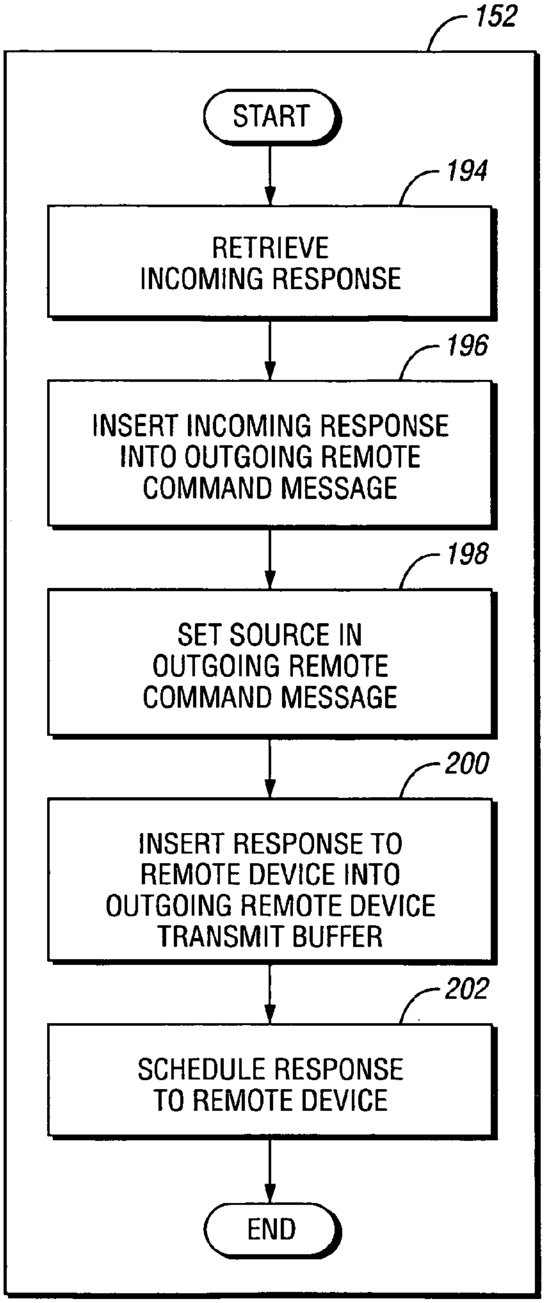
FIG. 9 is a block diagram illustrating a step wherein an incoming vehicle communication link response of FIG. 5 is processed.

Referring to FIG. 9, step 152, wherein an incoming response from the vehicle communication links is processed, is shown in more detail. At step 194 the incoming response is retrieved, preferably from a vehicle communication link buffer. At step 196, the incoming response is inserted into an outgoing remote command message which preferably includes a header as described hereinabove. At step 198 the algorithm 140 sets a source in the outgoing remote command message. The source may, for example, include information specifying the vehicle control module and communication link that sent the response. At step 200, the response is preferably inserted into an outgoing transmit buffer. At step 202, the response is scheduled to be sent. Scheduling essentially assigns a priority to the response thereby dictating when the response will actually be sent.

Figure 10:
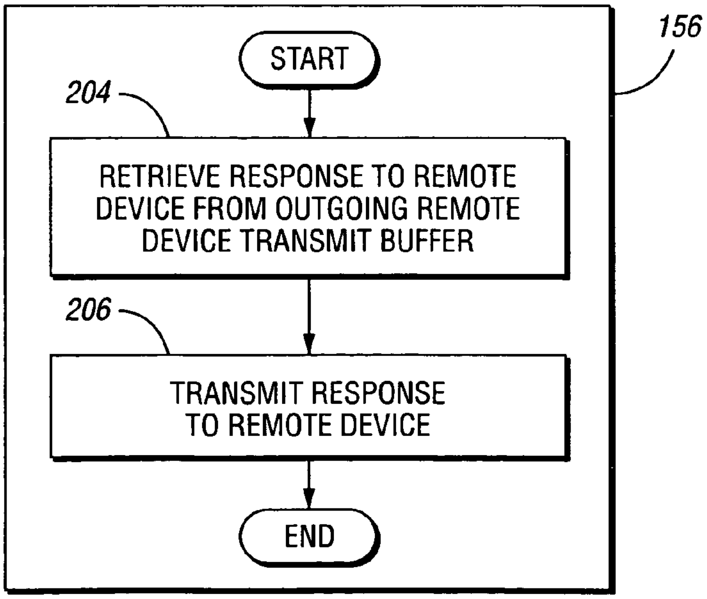
FIG. 10 is a block diagram illustrating a step wherein a response to a remote device of FIG. 5 is processed.

Referring to FIG. 10, step 156, wherein a response to a remote device is processed, is shown in more detail. At step 204, the response to the remote device is retrieved, typically from an outgoing remote device transmit buffer. At step 206 the response to the remote device is transmitted. The response is transmitted by the data recorder module 26 (shown in FIGS. 2-3) on any device adapted for telematics communication such as, for example, a cellular modem or a global positioning satellite link.

The steps shown in FIGS. 4-10 and described herein need not be performed in the order shown.

As set forth in the claims, various features shown and described in accordance with the different embodiments of the invention illustrated may be combined.

While the best modes for carrying out the invention have been described in detail, those familiar with the art to which this invention relates will recognize various alternative designs and embodiments for practicing the scope of the invention within the scope of the appended claims.

The invention claimed is:

1. A method for communicating the maintenance status of a vehicle system to a remote location relative to the vehicle, the vehicle having a communications link and a plurality of vehicle systems, the method comprising:

initializing a recorder module;

receiving a recorder module command from the remote location;

directing said recorder module command to the recorder module;

determining if said recorder module command is directed to said recorder module;

processing the recorder module command, wherein said processing includes checking said recorder module command for a signal commanding set-up of data collection of the maintenance status when said recorder module command is directed to said recorder module, and directing said recorder module command through said recorder module to the communications link as a pass-through command when said recorder module command is not directed to said recorder module;

generating a response to the recorder module command, wherein said response includes said collected maintenance status data when said recorder module command is directed to said recorder module;

transmitting the response to the remote location; and supplying power to the recorder module after the vehicle is turned off such that any unrecorded data may be preserved.

2. The method of claim 1 wherein said processing is directing the recorder module command to the communications link, further comprising reprogramming any of the plurality of vehicle systems in response to said pass-through command.

3. The method of claim 1, wherein said processing the recorder module commands includes collecting data from one or more predefined sources in response to the recorder module commands.

4. The method of claim 1, wherein said processing the recorder module commands includes retrieving data from the recorder module in response to the recorder module commands.

5. The method of claim 1, wherein said processing the recorder module commands includes recording data onto the recorder module in response to the recorder module commands.

6. The method of claim 1, wherein said processing the recorder module commands includes reprogramming the recorder module in response to the recorder module commands.

7. The method of claim 1, further comprising powering-down the recorder module after the unrecorded data is preserved to conserve energy.

8. A method for remotely accessing at least one of a plurality of vehicle systems in a vehicle having a vehicle communications link, the method comprising:

initializing a recorder module;

receiving a pass-through command from a remote source relative to the vehicle wherein the pass-through command is a recorder module command that is passed through said recorder module to the vehicle communications link without being recorded by the recorder module;

processing the pass-through command including transferring the pass-through command to the vehicle system thereby allowing remote reprogramming and monitoring of any of the vehicle systems;

receiving a recorder module command from a remote source relative to the vehicle wherein the recorder module command is directed to the recorder module;

processing the recorder module command;

generating a response to the recorder module command; and transmitting the response to a remote location relative to the vehicle.

9. The method of claim 8 further comprising supplying power to the recorder module after the vehicle is turned off such that any unrecorded data may be preserved.

10. The method of claim 9 further comprising powering-down the recorder module after the unrecorded data is preserved to conserve energy.

* * * * *